United States Patent
Fickers et al.

(10) Patent No.: US 8,299,164 B2
(45) Date of Patent: Oct. 30, 2012

(54) WATER-BASED TWO LAYER COATING SYSTEMS BASED ON URETHANE, THE USE THEREOF AND SUBSTRATES COATED WITH THEM

(75) Inventors: Anne Fickers, Münster (DE); Heinz-Peter Rink, Münster (DE); Andreas Dopp, Senden (DE)

(73) Assignee: BASF Coatings GmbH, Munich (DE)

( * ) Notice: Subject to any disclaimer, the term of this patent is extended or adjusted under 35 U.S.C. 154(b) by 199 days.

(21) Appl. No.: 12/598,803

(22) PCT Filed: Apr. 30, 2008

(86) PCT No.: PCT/EP2008/003488
§ 371 (c)(1), (2), (4) Date: Mar. 3, 2010

(87) PCT Pub. No.: WO2008/135210
PCT Pub. Date: Nov. 13, 2008

(65) Prior Publication Data
US 2010/0324199 A1    Dec. 23, 2010

(30) Foreign Application Priority Data
May 4, 2007 (DE) .......................... 10 2007 021 013

(51) Int. Cl.
*C08L 75/00* (2006.01)
*C08G 69/26* (2006.01)

(52) U.S. Cl. ........................ 524/507; 524/538
(58) Field of Classification Search .................. 524/507, 524/538; 427/379
See application file for complete search history.

(56) References Cited

U.S. PATENT DOCUMENTS

| | | | |
|---|---|---|---|
| 6,001,915 A * | 12/1999 | Schwarte et al. | 524/457 |
| 6,607,788 B1 * | 8/2003 | Wegner et al. | 427/388.4 |
| 6,767,958 B2 | 7/2004 | Laas et al. | |
| 2006/0084775 A1 | 4/2006 | Rische et al. | |
| 2006/0205857 A1 * | 9/2006 | Hofacker et al. | 524/457 |

FOREIGN PATENT DOCUMENTS

| | | |
|---|---|---|
| DE | 4010176 A1 | 10/1991 |
| DE | 10237193 A1 | 2/2004 |
| DE | 10308103 A1 | 9/2004 |
| EP | 0657483 A1 | 6/1995 |
| EP | 0742239 A1 | 11/1996 |
| EP | 1702954 A2 | 9/2006 |
| WO | WO95/16004 A1 | 6/1995 |

OTHER PUBLICATIONS

Teachnical Datasheet of Ineos melamines, 2011.*
International Search Report for PCT/EP2008/003488dated Jul. 22, 2008.
Written Opinion for PCT/EP2008/003488 international filing date of Apr. 30, 2008.
International Preliminary Report on Patentability for International application No. PCT/EP2008/003488 dated Dec. 7, 2009.
"Die Losemittelfreie Generation"; Bayer GmbH Press Release, Leverkusen, Germany; Feb. 21, 2007.
Bayer AG; Pressrelations, schneller mehr wissen; "Neue Generation von Hartern fur wassrige Polyurethan-Lacke—Graffiti-abweisend und umweltvertraglich"; Apr. 22, 2005; http://www.pressrelations.deinew/standard/dereferrer.cfm?r=187235.
Goldschmidt, A. and Streitberger, H.-J.; Lackiertechnik; BASF-Handbuch Lackiertechnik; Vincentz Verlag; Hannover, Germany; ISBN 3-87870-324-4; p. 94; (2002).
Falbe, J. and Regitz, M., Ed.; "Rompp Chemie Lexikon"; Geor Thieme Verlag; Stuttgart, Germany; p. 1795; (1995).

* cited by examiner

*Primary Examiner* — Ling Choi
*Assistant Examiner* — Aiqun Li
(74) *Attorney, Agent, or Firm* — Cantor Colburn LLP

(57) ABSTRACT

Disclosed is an aqueous clearcoat material for producing a waterborne urethane-based two-coat coating system, comprising at least one secondary polyacrylate dispersion having a polyacrylate glass transition temperature $T_g \geq 20°$ C. and at least one hybrid polyacrylate-polyurethane dispersion with a weight ratio of the polyacrylate fraction of the secondary dispersion to the polyacrylate-polyurethane fraction of the hybrid dispersion of 1:1 to 4:1, and as curing agent at least one low-viscosity aminosulfonic polyisocyanate and an aqueous basecoat material for producing a waterborne two-coat coating system comprising at least one polyurethane dispersion, at least one hybrid polyacrylate-polyurethane dispersion, and at least one melamine resin. Also disclosed are a waterborne two-coat coating system comprising the clearcoat material and the basecoat material, a process for producing it, its use to coat a substrate, and substrates coated with it.

18 Claims, No Drawings

WATER-BASED TWO LAYER COATING SYSTEMS BASED ON URETHANE, THE USE THEREOF AND SUBSTRATES COATED WITH THEM

CROSS REFERENCE TO RELATED APPLICATIONS

This application is a National Phase Application of Patent Application PCT/EP2008/003488 filed on 30 Apr. 2008, which claims priority to DE102007021013.4, filed 4 May 2007, both of which are hereby incorporated by reference in their entirety.

FIELD OF THE INVENTION

The invention relates to waterborne urethane-based two-coat coating systems, to aqueous basecoat materials and aqueous clearcoat materials for producing these two-coat coating systems, to their use, and to substrates coated with them.

BACKGROUND OF THE INVENTION

State of the art in automotive OEM finishing includes two-coat coating systems composed of a basecoat material and a clearcoat material, also referred to collectively as topcoat materials. The purpose of these coatings systems is to protect the coats situated beneath them and to endow the overall paint system with the desired optical properties and the requisite weather resistance. Basecoat materials comprise pigments to impart color and/or effect. Clearcoat materials protect the basecoat and intensify its optical effect. Topcoat materials may be solventborne or aqueous.

Waterborne urethane-based two-coat coating systems are known in the art (BASF Handbuch Lackiertechnik, Vincentz Verlag, 2002, pp. 98-99). They may be based on aqueous polyurethane dispersions and on hybrid polyacrylate-polyurethane resins (Winnacker, Küchler, Chemische Technik—Prozesse und Produkte, Volume 7—Industrieprodukte, Wiley VCH, 2004, pp. 662-669).

Aqueous polyurethane dispersions can be prepared by emulsifying hydrophobic polyurethanes in water with the aid of external emulsifiers. Also possible, however, is to make the polyurethane self-dispersible by incorporating hydrophilic groups. Dispersibility in water can be achieved, for example, through carboxylate groups which have been converted, using amines, into anionic groups (anionic, polyurethane dispersions). It is also possible to obtain dispersibility in water through reaction of tertiary amino alcohols with prepolymers which still contain free isocyanate functions, followed by neutralization with acid (cationic polyurethanes). A further alternative is that of modifying prepolymers having free isocyanate functions with water-soluble long-chain polyethers (nonionic polyurethanes). Aqueous dispersions of polyurethanes can be prepared by a variety of methods, which are described in Winnacker, Küchler, Chemische Technik—Prozesse und Produkte, Volume 7—Industrieprodukte, Wiley VCH, 2004. These methods include the acetone method, the prepolymer mixing method, and the melt dispersion method.

The aim of using hybrid polyacrylate-polyurethane resins is to combine the positive properties of the two types of polymer employed and to minimize the negative properties. Depending on type they are differentiated as hybrid systems generated by cleanly mixing the different dispersions (blends), hybrid systems in which a chemical connection exists, at least to a certain extent, between the different kinds of polymer, and hybrid dispersions in which the different classes of polymer form interpenetrating networks (IPNs).

Aqueous coating systems based on the stated hybrid polyurethane-polyacrylate dispersions are already known and widespread within the paint industry. Typically the hybrid polyurethane-polyacrylate dispersions are prepared by emulsion-polymerizing a vinylpolymer ("polyacrylate") in an aqueous polyurethane dispersion. It is also possible, however, to prepare the hybrid polyurethane-polyacrylate dispersions as secondary dispersions.

The term "secondary dispersions" refers to those aqueous dispersions which to start with are polymerized in a homogeneous organic medium and thereafter are redispersed in an aqueous medium with neutralization, generally without the addition of external emulsifiers.

WO-A 95/16004, for example, describes water-thinnable film-forming binders based on oligourethane-acrylate copolymers. In that case a monomer mixture of vinylically unsaturated monomers is subjected to free-radical polymerization in a water-dilutable organic solvent and in the presence of a water-soluble oligourethane having a molecular mass of 750 to 1000. This secondary dispersion is then used to formulate baking varnishes.

DE-A 40 10 176 discloses oxidatively drying coating materials using as their binder a polymer which is obtainable by subjecting ethylenically unsaturated monomers to polymerization in an organic solvent in the presence of a polyurethane resin that contains polymerizable double bonds.

EP-A 657 483 describes aqueous two-component coating materials composed of a polyisocyanate component and an aqueous polyurethane dispersion as polyol component. The polyol component is prepared by neutralization and dispersion of unsaturated polyurethane macromers hydrophilicized with acid groups and containing lateral and/or terminal vinyl groups. These PU macromers, where appropriate following addition of further vinylic monomers, are then subject to free-radical polymerization in an aqueous phase.

EP-A 742 239, finally, discloses two-component coating systems based on polyisocyanate crosslinkers and aqueous, hydroxy-terminated polyurethane prepolymers/acrylic hybrids. These hybrid polymers are obtained by reacting a water-dispersible NCO-functional urethane prepolymer with at least one hydroxy-functional acrylate monomer and an alkanolamine to form a hydroxy-functional urethane prepolymer/monomer mixture, which is dispersed in water. A free-radical initiator and a hydroxy-containing chain extender are then added to this dispersion, after which the aqueous reaction mixture is heated, and the free-radical polymerization of the acrylate monomers and the chain extension step of the polyurethane are carried out and completed. The resultant hydroxy-functional polyurethane prepolymer/acrylic hybrid dispersions can then be formulated into the ready-to-use two-component coating compositions by incorporating hydrophilicized polyisocyanates with stirring. A disadvantage here is the use of up to 6% of molecular weight regulators, based on acrylate monomer (e.g., thiols), which may adversely affect important paint properties such as resistance properties and film hardeners.

Secondary hybrid polyurethane-polyacrylate dispersions suitable for preparing two-component (2K) coating compositions are disclosed in DE-A 103 08 103. The hybrid polyurethane-polyacrylate dispersions described there are prepared from a polyurethane having a molecular weight $M_n$ of 1100 to 10 000 and from one or more vinylically unsaturated monomers, which are free-radically polymerized in a homogeneous, nonaqueous phase, undergo at least partial neutralization, and are then dispersed in an aqueous phase. They are suitable for a variety of fields of use.

Used as two-coat coating systems on polymeric substrates in particular, however, these two-component coating compositions lack adequate adhesion: on polymeric substrates which are coated directly, without adhesion promoter, with the coating system in the form of an aqueous basecoat material, direct adhesion is found to be lacking. Additionally, the adhesion of the coating systems, as aqueous basecoat materials, to polymeric substrates coated with adhesion promoters fails to meet the requirements. Moreover, following build-up with a waterborne clearcoat material, aqueous basecoat materials based on this system undergo swelling, as is evident, among other things, after a 100-hour immersion test at 40° C. Furthermore, they or their aqueous clearcoat materials do not exhibit the combined profile of properties desired on polymeric substrates, namely the combination of a high flexibility with to good wash-brush resistance and good chemical resistance.

It is an object of the invention, therefore, to provide an aqueous clearcoat material for producing a waterborne urethane-based two-coat coating system, said coating material satisfying the typical requirements imposed on coating systems, more particularly the requirements concerning the gloss (a gloss value of greater than 85) and concerning the development of haze. A further intention is that an aqueous clearcoat material should be provided for producing a waterborne urethane-based two-coat coating system which on plastics displays a combined profile of properties with high flexibility in conjunction with good wash-brush resistance and good chemical resistance.

It is a further object of the invention to provide an aqueous basecoat material which is intended for producing a waterborne urethane-based two-coat coating system which on all substrates, more particularly polymeric substrates, exhibits effective adhesion with or without adhesion promoter. It is a preferred object of the invention, furthermore, to provide a corresponding aqueous basecoat material which, after build-up with a waterborne clearcoat material, exhibits only slight swelling.

It is also the aim that a waterborne urethane-based two-coat coating system be provided which meets the requirements imposed on the aqueous clearcoat material and the requirements imposed on the aqueous basecoat material. In addition the two-coat coating system provided ought to have good processing properties, i.e., a high circulation stability in particular.

SUMMARY OF THE INVENTION

The invention constitutes an aqueous clearcoat material for producing a waterborne urethane-based two-coat coating system, which comprises at least one secondary polyacrylate dispersion having a polyacrylate glass transition temperature $T_g \geq 20°$ C., measured by differential scanning calorimetry (DSC), and at least one hybrid polyacrylate-polyurethane dispersion, with a weight ratio of the polyacrylate fraction of the secondary dispersion to the polyacrylate-polyurethane fraction of the hybrid dispersion of 1:1 to 4:1, preferably 2:1 to 3:1, more preferably 2.25:1 to 2.75:1, and as curing agent at least one low-viscosity aminosulfonic polyisocyanate.

DETAILED DESCRIPTION OF A PREFERRED EMBODIMENT OF THE INVENTION

The aqueous clearcoat materials of the invention exhibit high flexibility in tandem with good wash-brush resistance and good chemical resistance. Furthermore, the aqueous clearcoat materials of the invention for producing waterborne two-coat coating systems meet the requirements in terms of gloss and low development of haze.

The secondary polyacrylate dispersion preferably has an OH fraction of 2.5% to 4.5% by weight, based on the solids fractions. With further preference it has a polyacrylate glass transition temperature of 20 to 70° C. as measured by DSC. With further preference the secondary polyacrylate dispersion has a viscosity of about 200 to about 2500 mPas at 23° C., measured in accordance with DIN EN ISO 3219/A.3. Preferred commercial products are BAYHYDROL XP 2469, BAYHYDROL A 145, and BAYHYDROL XP 2470 from Bayer Material Science. Particularly preferred is BAYHYDROL XP 2470, having an OH fraction of 3.9% by weight, a viscosity of approximately 2000 mPas at 23° C., measured in accordance with DIN EN ISO 3219/A.3, and a glass transition temperature $T_g$ of 50° C. (measured via DSC).

The hybrid polyacrylate-polyurethane dispersion can be prepared via a polyurethane precursor which is preparable by reacting at least one diisocyanate with at least one linear polyester and subsequently blocking the prepolymers with diethanolamine. It is preferred to use the diisocyanate TMXDI. The linear polyester is based preferably on an acid component of dimer fatty acid and/or isophthalic acid and on an alcohol component of neopentylglycol and/or hexanediol. This precursor can then be introduced initially, in an organic phase, for the preparation of the hybrid dispersion. In the presence of this polyurethane precursor, then, in one stage or in two or more successive stages, (meth)acrylic acid and/or (meth)acrylate is polymerized with vinylically unsaturated compounds. In the case of a multistage polymerization the reaction regime may proceed via a staged addition of individual compounds or classes of compound and/or a staged addition of mixtures of at least two classes of compound. In one preferred multistage reaction regime, styrene, butyl acrylate, hydroxyethyl acrylate and cyclohexyl methacrylate are polymerized and reaction with acrylic acid is carried out in at least one stage. Following polymerization, the product is neutralized and the process solvent removed. The solids content amounts to 35% by weight.

The low-viscosity aminosulfonic polyisocyanate may be an HMDI-based or IPDI-based polyisocyanate. The aminosulfonic polyisocyanate is preferably an HMDI-based polyisocyanate. The low-viscosity aminosulfonic polyisocyanate preferably has a viscosity of between 2000 and 8000 mPas at 23° C. measured in accordance with DIN EN ISO 3219/A.3. With further preference it has an NCO content of 17.0-25.0% by weight. Even more preferably its NCO functionality F is 2.5 to 3.8. Corresponding commercial products are, for example, BAYHYDUR XP 2487/1 and BAYHYDUR XP 2570 from Bayer Material Science. Particular preference is given to using the aminosulfonic HMDI trimer available commercially as BAYHYDUR XP 2570, having a viscosity of 3500 mPas at 23° C., measured in accordance with DIN EN ISO 3219/A.3, an NCO content of 20.5% by weight, and an NCO functionality F=3.0.

The clearcoat material of the two-coat coating system may further comprise as curing agent a hydrophobic polyisocyanate of low viscosity, which increases the curing rate and lowers the viscosity of the curing agent. In addition, the sensitivity of the cured coatings to water is reduced. This low-viscosity polyisocyanate preferably has a viscosity of less than 1500 mPas, measured at 23° C. in accordance with DIN EN ISO 3219/A.3. For this purpose it is preferred to use HDI trimers. Examples of hydrophobic polyisocyanates of this kind are DESMODUR N 3600 and DESMODUR XP 2410 from Bayer Material Science, having an NCO content of 23.0% and 24.0% by weight, a viscosity of 1200 and 700 mPas at 23° C. measured in accordance with DIN EN ISO 3219/A.3, an NCO functionality F of 3.2 and 3.1, and an equivalent weight of 180 and 175, respectively. As a hydrophobic low-viscosity polyisocyanate it is particularly preferred to use DESMODUR XP 2410.

In addition to the ingredients specified, the clearcoat material of the two-coat coating system of the invention may further comprise at least one additive such as, for example, a wetting agent, a dispersant, an adhesion promoter, a corrosion inhibitor, a flow control agent, a defoamer, a biocide, a light stabilizer, a wax, barium sulfate with a particular size less than 25 nm, a matting agent and/or a thickener.

High adhesion between clearcoat and aqueous basecoat, and high adhesion to the substrate (directly to the polymeric substrate or to a substrate coated with a cathodic deposition coating system) are exhibited by aqueous basecoat materials, used for to preparing waterborne two-coat coating systems of the aforementioned type that comprise at least one polyurethane dispersion, at least one hybrid polyacrylate-polyurethane dispersion of the type already described, and at least one melamine resin. Even under the clearcoats used in accordance with the invention, these aqueous basecoats exhibit little or no swelling and have good processing properties. In particular they exhibit the desired circulation stability.

The weight ratio of the polyurethane binder fraction of the at least one polyurethane dispersion to the hybrid polyacrylate-polyurethane binder fraction of the at least one hybrid polyacrylate-polyurethane dispersion of the aqueous basecoat material is preferably 3:1 to 5.5:1, more preferably 4:1 to 4.5:1.

The polyurethane dispersion used in the aqueous basecoat material is preparable from UV-stable di- or polyisocyanates, polyethers and/or polyesters having molar masses $M_n$ of between 600 and 2000, and low molecular mass diols and/or ethanolamines. Low molecular mass diols and/or ethanolamines are understood in this context to be compounds with a molar mass range from 62 to 600. As diisocyanates it is preferred to use hexamethylene diisocyanate, tetramethylxylylene diisocyanate, 1,3-isocyanatomethylcyclohexane, isophorone diisocyanate, and bis(para-isocyanatocyclohexyl) methane. It is also possible to use mixtures of the specified compounds or corresponding oligomers, such as isocyanurates, allophanates, and uretdiones, for example. Particularly preferred is the monomeric bis(para-isocyanatocyclohexyl) methane which is available as a commercial product, DESMODUR W, and which has a viscosity to DIN EN ISO 3219/A.3 of approximately 30 mPas at 25° C. and an NCO content of 31.8% by weight, and also isophorone diisocyanate. As polyesters it is preferred to use compounds based on an acid component of dimer fatty acid and/or isophthalic acid and on a hydroxy-functional component of hexanediol, neopentylglycol and/or dimethylolpropionic acid. The subsequent chain extension of the prepolymer is carried out preferably with trimethylolpropane. The polyurethane dispersion can be obtained following neutralization, dispersion, and removal of the process solvent. As polyethers it is preferred to use low molecular mass polyethylene glycols or polybutylene glycols having molecular weights of approximately 200 to 1000.

The at least one hybrid polyacrylate-polyurethane dispersion used in the aqueous basecoat material, of the type already described, is preferably identical with that used in the aqueous clearcoat material.

The weight ratio of the binder fraction of the at least one melamine resin used in the aqueous basecoat material to the sum of the weight fractions of the at least one poly-urethane dispersion and of the at least one hybrid polyacrylate-polyurethane dispersion is preferably between 1:2 and 1:8, with particular preference 1:3 to 1:4.

As melamine resin it is preferred to use an alkoxyalkylated melamine resin such as the methoxymethylated and butoxymethylated commercially available CYMEL 1133, in order to attain good water resistance, flexibility, and storage stability properties.

Two-coat coating systems which are producible by combining an aqueous clearcoat material of the type described above with an aqueous basecoat material of the type described above meet the requirements imposed on the aqueous clearcoat material and aqueous basecoat material, and have good processing properties. In particular they feature good circulation stability.

Another component of the invention is the use of the two-coat coating system of the invention to coat substrates, and also these coated substrates themselves. For coating, a pretreated or unpretreated substrate is coated on at least one side with the aqueous basecoat material and dried, then coated with the aqueous clearcoat material, and dried again. The drying after the application of the first coat takes place preferably after several minutes' intermediate drying over a period of 3 to 15 minutes at temperatures of 40 to 100° C. The second drying step, following application of the aqueous clearcoat material, takes place preferably after a flash-off time of 30 minutes to an hour at a temperature of less than 120° C., preferably 60 to 100° over a time of 10 to 30 minutes. Preferred film thicknesses of the individual coats of the dried two-coat coating are approximately 10 to 25 μm for the aqueous basecoat film and 30 to 60 μm for the aqueous clearcoat film.

The substrates coated may comprise SMC, PA/PPO, PU/RIM, PC-PBT, GRP, PPO, PP/EPDM. Preferably the substrates common in the automobile and utility-vehicle to segment are coated with the two-coat coating system of the invention. With particular preference the coated substrates claimed are plastics substrates from the automobile and utility-vehicle segment.

EXAMPLES

Inventive Polyurethane Dispersions I for the Aqueous Basecoat Materials

Preparation of a Polyesterpolyol a for the Inventive Polyurethane Dispersion I

A steel reactor suitable for polycondensation reactions was charged with 4634 g of Pripol 1012 (dimer fatty acid from Unichema), 2577 g of 1,6-hexanediol, 1372 g of isophthalic acid, and 110 g of xylene as entrainer, and this initial charge was heated to 150° C. The temperature of the mixture was raised in such a way (not more than 220° C.) that the overhead column temperature did not climb above 125° C. At an acid number of 5, distillative removal was commenced, and was continued to an acid number of 3.5.

Subsequently the polyester is diluted in methyl ethyl ketone to an SC of 73%.

Preparation of the Inventive Polyurethane Dispersion I 1434 g of the polyester resin solution A were heated together with 384 g of methyl ethyl ketone, 85 g of dimethylolpropanoic acid, 14 g of neopentylglycol, and 392 g of isophorone diisocyanate to a constant isocyanate content. Subsequently, based on an NCO content of 1.1%, 38 g of trimethylolpropane were added. In a viscosity range of 10-14 dPas (1:1 measured in N-methylpyrrolidone), 40 g of n-butanol were added to prevent further reaction. After the batch had been stirred at 82° C. for 60 minutes, 43 g of dimethylethanolamine were added. After the batch had been stirred at 82° C. for 30 minutes, 170 g of butylglycol were added, followed by a further 30 minutes of stirring at 82° C. After that, 3550 g of water were added with stirring. By distillation at approximately 70° C. under reduced pressure, the methyl ethyl ketone was removed down to a residual content of less than 0.5%. Finally, a solids content (1 h 130° C.) of 27% was set using deionized water. The pH was 7.7. The material is homogeneous and free from specks and threads.

Inventive Hybrid Polyacrylate-Polyurethane Polymer I for Clearcoat Materials and Aqueous Basecoat Materials Preparation of a Polyesterpolyol for Preparing a Polyurethane Resin Solution A steel reactor suitable for polycondensation reactions was charged with 728.3 g of Pripol 1012 (dimer fatty acid from Unichema), 239.2 g of 1,6-hexanediol, 294.4 g of isophthalic acid and 204.8 g of neopentylglycol and also 180 g of xylene as entrainer and this initial charge was heated to 150° C. The temperature of the mixture was raised in such a way (maximum 220° C.) that the overhead column temperature did not climb above 125° C. At an acid number of 5, distillation was commenced, and the regime was continued to an acid number of 3.5. Subsequently the polyester is diluted in methyl ethyl ketone to an SC of 73%.

Preparation of a Polyurethane Resin Solution for Preparing the Hybrid Polyacrylate-Polyurethane Polymer A steel reactor suitable for preparing polyurethane resins, with a reflux condenser, was charged with 2351.2 g of the above-described polyester resin solution, 107.3 g of neopentylglycol, 692.5 g of TMXDI, and 01.75 g of dibutyltin dilaurate and this initial charge was heated at 80 to 90° C. When a constant NCO content was reached, 47.7 g of N,N-diethanolamine were added. After the end of the reaction the product was diluted with butylglycol to a solids content of 60%.

Preparation of the Hybrid Polyacrylate-Polyurethane Polymer I

A steel reactor suitable for the polymerization, with reflux condenser, was charged with 1355.6 g of the above-described organic polyurethane resin solution and 759.8 g of butylglycol and this initial charge was heated to approximately 110° C. With the temperature maintained, a mixture of 679.2 g of styrene, 1824.8 g of butyl acrylate, 775 g of cyclohexyl acrylate, and 1225.4 g of hydroxyethyl acrylate was metered into this initial charge over the course of 5 h at a uniform rate, and a mixture of 580 g of butylglycol and 495.4 g of tert-butyl peroxy-2-ethylhexanoate is metered in over the course of 5.5 h at a uniform rate. After a further hour, beginning simultaneously, a mixture of 363.6 g of butyl acrylate, 135.6 g of styrene, 154.4 g of cyclohexyl acrylate, 245.0 g of hydroxyethyl acrylate, and 299.8 g of acrylic acid was metered in uniformly over 1 h, and a mixture of 552 g of butylglycol and 107.8 g of tert-butyl peroxy-2-ethylhexanoate was metered in over the course of 1.5 hours at a uniform rate. When there was no longer any significant increase in solids content, the batch was heated to 120° C. and stripped under reduced pressure until the residual monomer content reached less than 0.3% and the viscosity (10:6 in butylglycol) reached approximately 5 to 5.8 dPas. After the batch had been cooled to approximately 90° C., 224.8 g of N,N-diethylethanolamine were added and the product was diluted with deionized water and adjusted to a solids content of 35%. The pH of the dispersion was 7.4.

Example

Compositions

| 2K aqueous clearcoat material: | | | |
|---|---|---|---|
| 1st component: | Secondary polyacrylate dispersion, 45% by weight | BAYHYDROL XP2470 | 52.80 parts by weight |
| | Hybrid polyacrylate-polyurethane polymer I, 35% by weight | | 26.80 parts by weight |
| | Water | | 10.00 parts by weight |
| | Butylglycol | | 1.66 parts by weight |
| | Polyester | K-FLEX 188 | 5.70 parts by weight |
| | Various additives | | 5.24 parts by weight |
| | | | 102.20 parts by weight |
| 2nd component: | Hydrophilicized HDI polyisocyanate | BAYHYDUR XP 2570 | 38.00 parts by weight |
| | Aliphatic HDI polyisocyanate | DESMODUR XP 2410 | 33.00 parts by weight |
| | Butylglycol acetate | | 29.00 parts by weight |
| | | | 100.00 parts by weight |

Millbase component: curing agent mixing ratio in coating material as used:
100:43 by weight

| Aqueous basecoat material: | |
|---|---|
| Water | 38.59% by weight |
| Polyurethane dispersion I, 27% by weight | 30.30% by weight |
| Hybrid polyacrylate-polyurethane polymer I, 35% by weight | 5.50% by weight |
| CYMEL 1133   melamine resin | 2.80% by weight |
| Pigment paste fraction | 8.80% by weight |
| Further ingredients | 14.01% by weight |
| | 100.00% by weight |

Production of a Coated Substrate:

A metallic substrate pretreated with a cathodic deposition coating (CATHOGUARD 500, BASF Coatings AG) and a surfacer (2840-20, GLASURIT GmbH) is coated pneumatically with the aqueous basecoat material. Five-minute flash-off is followed by drying at 80° C. for 10 minutes. The film thickness thus obtained is between 12 and 20 µm.

Subsequently the aqueous clearcoat material is applied pneumatically. Forty-minute flash-off is followed by twenty-minute drying at 80° C. The film thicknesses achieved are 40 to 50 µm.

The coatings obtained in this way have the following characteristic properties:

Visual Impression

| | |
|---|---|
| Pop-free, 20° gloss | 92 E |
| lw | 1.9 |
| sw | 16 |
| Distinctness of image | 82 |

AMTEC (DIN 55668, 10 Cycles)

| | |
|---|---|
| Initial gloss 20° | 92 |
| 20° gloss, without cleaning | 33 |
| 20° gloss, with cleaning | 68 |
| Reflow time [min] | 120 |
| Reflow temperature [° C.] | 80 |
| 20° gloss, reflow, unclean side | 39 |
| 20° gloss, reflow, cleaned side | 80 |

Chemical Resistance

| | Chemistry EN ISO 2812-1, method 2 | | | | GME 60409, 38% sulfuric acid, 48 h RT |
|---|---|---|---|---|---|
| Test substance | Exposure time and temperature | Surface change DIN 53230 instantaneous | Surface change DIN 53230 after 1 h | Surface change DIN 53230 after 24 h | Surface change instantaneous |
| — | — | — | — | — | 8 |
| Diesel | 24 h RT | 0 | 0 | 0 | |
| Ethylene glycol 50% | 24 h RT | 0 | 0 | 0 | |
| Isopropanol 50% | 24 h RT | 2 | 2 | 1 | |

Mechanical Values

Adhesion Tests

| Systems | BC | CC |
|---|---|---|
| | LY4506-99-E | LY4669-23-A |

| | Cross-cut ISO 2409 | Stonechip STD 234 (Scania) | Impact ISO 6272-1 | Gloss ISO 2813 | Swelling |
|---|---|---|---|---|---|
| No exposure (aged 50° overnight) | 0 | 1.5 | ok | 90 | |
| 96 h water storage + 1 h RT (to ISO 2812-2, 96 h at 40° C.) | 0 | 1.5 | | | 2 |
| 4 h −25° C. - storage | 0 | 1.5 | ok | | |

Test results for plastic substrates coated with two-coat coating system
Physical tests
Test results

| | OEM parts, industry standard Plant standard | Substrates | | | | | |
|---|---|---|---|---|---|---|---|
| | | SMC | PA/PPO | PU/RIM | PC-PBT | GRP | PPO |
| Physical properties | DIN VDA | Film thickness | | | | | |
| | | 70-80 μm | 70-80 μm | 70-80 μm | 70-80 μm | 70-80 μm | 70-80 μm |
| Pendulum hardness (König) (DIN 53 157/ ISO 1552-1973) | >50-100 s | 80 s | 50 s | 115 s | 80 s | 100 s | 100 s |
| Erichsen cupping (DIN 53 156) | >4 mm | 6-9 mm | 6-9 mm | 6-8 mm | 8 mm | 6-8 mm | 6-8 mm |
| Mandrel bending test (cylindrical) (DIN 53 152/ISO 1519-1973) | 2.5 cm | <2.5 cm | <2.5 cm | <2.5 cm | <2.5 cm | <2.5 cm | <2.5 cm |

Test results for plastic substrates coated with two-coat coating system
Physical tests
Test results

| Physical properties | OEM parts, industry standard Plant standard DIN VDA | Substrates | | | | | |
|---|---|---|---|---|---|---|---|
| | | SMC | PA/PPO | PU/RIM | PC-PBT | GRP | PPO |
| | | Film thickness | | | | | |
| | | 70-80 μm | 70-80 μm | 70-80 μm | 70-80 μm | 70-80 μm | 70-80 μm |
| Mandrel bending test (conical) (DIN ISO 6860) | 2 cm | 0 cm | 0 cm | 0 cm | 0 cm | 0 cm | 0 cm |
| Cross-cut testing (multiple cuts) (DIN 53 151/ISO 24 09-1972) | <1 | 0-1 | 1 | 1 | 0 | 1 | 1 |
| Stone-chip testing (VDA 621 415) | 1.5-3 | 1 | 1.5 | 1 | 1-2 | 1.5 | 1.5 |

Test results for plastic substrates coated with two-coat coating system
Humidity/weathering tests
Test results

| Weathering tests | Plant standard DIN VDA | Substrates | | | | |
|---|---|---|---|---|---|---|
| | | SMC | PU/RIM | GRP | SMC | PU/RIM |
| | | Film thickness | | | | |
| | | 70-80 μm | 70-80 μm | 70-80 μm | 70-80 μm | 70-80 μm |
| | | Water spray test (BASF standard) - 360 h | | | | |
| Blistering (DIN 53209 ASTM D714-56) | 0 | 0 | 0 | 0 | 0 | 0 |
| Cross-cut test (DIN 53 151 ISO 2409-1972) | 0-2 | 0-1 | 0-1 | 0-1 | 0-1 | 1 |
| | | Condensation climate weathering test DIN 50 017 ASTM D 2247-68 - 480 h | | | | |
| Blistering (DIN 53209 ASTM D714-56) | 0 | 0 | 0 | 0 | 0 | 0 |
| Cross-cut test (DIN 53 151 ISO 2409-1972) | 0-2 | 0-1 | 1 | 1 | 0-1 | 1 |

What is claimed is:

1. An aqueous clearcoat material for producing a waterborne urethane-based two-coat coating system, the aqueous clearcoat material comprising
   at least one secondary polyacrylate dispersion having a polyacrylate glass transition temperature $T_g \geq 20°$ C.,
   at least one hybrid polyacrylate-polyurethane dispersion, and
   a curing agent comprising at least one aminosulfonic polyisocyanate, and
   wherein the aqueous clearcoat material has a weight ratio of a polyacrylate fraction of the secondary dispersion to a polyacrylate-polyurethane fraction of the hybrid dispersion of from 1:1 to 4:1.

2. The aqueous clearcoat material of claim 1, wherein the secondary polyacrylate dispersion comprises an OH fraction of 2.5% to 4.5% by weight, based on the solids fractions.

3. The aqueous clearcoat material of claim 1, wherein the secondary polyacrylate dispersion comprises a polyacrylate glass transition temperature $T_g$ of 20 to 70° C.

4. The aqueous clearcoat material of claim 1, wherein the secondary polyacrylate dispersion comprises a viscosity of 200 to 2500 mPas at 23° C.

5. The aqueous clearcoat material of claim 1, wherein the hybrid polyacrylate-polyurethane dispersion is made by
   initially introducing, in an organic phase, a polyurethane precursor prepared by reacting at least one diisocyanate with at least one linear polyester to produce prepolymers, and subsequently blocking the prepolymers with diethanolamine,
   in one or more stages, polymerizing (meth)acrylic acid and/or (meth)acrylate with vinylically unsaturated compounds in the presence of the polyurethane precursor, and
   carrying out neutralization and removing the process solvent.

6. The aqueous clearcoat material of claim 1, wherein the aminosulfonic polyisocyanate is an HMDI- or IPDI-based polyisocyanate.

7. The aqueous clearcoat material of claim 1, further comprising as curing agent a hydrophobic polyisocyanate.

8. The aqueous clearcoat material of claim 1, further comprising at least one additive.

9. A waterborne urethane-based two-coat coating system comprising an aqueous clearcoat material of claim 1 and an aqueous basecoat material comprising at least one polyurethane dispersion, at least one hybrid polyacrylate-polyurethane dispersion, and at least one melamine resin.

10. The waterborne urethane-based two-coat coating system of claim 9, wherein the weight ratio of a polyurethane binder fraction of the at least one polyurethane dispersion to a hybrid polyacrylate-polyurethane binder fraction of the at least one hybrid polyacrylate-polyurethane dispersion of the aqueous basecoat material is 3:1 to 5.5:1.

11. The waterborne urethane-based two-coat coating system of claim 9, wherein said at least one polyurethane dispersion is prepared from
   UV-stable di- and/or polyisocyanates,
   polyethers and/or polyesters having molar masses $M_n$ of between 600 and 2000,
   and diols and/or ethanolamines.

12. The waterborne urethane-based two-coat coating system of claim 9, wherein the at least one hybrid polyacrylate-polyurethane dispersion of the aqueous basecoat material is prepared by
   initially introducing, in organic phase, a polyurethane precursor prepared by reacting at least one diisocyanate with at least one linear polyester to produce prepolymers, and subsequently blocking the prepolymers with diethanolamine,
   in one or more stages, polymerizing (meth)acrylic acid and/or (meth)acrylate with vinylically unsaturated compounds in the presence of the polyurethane precursor, and
   carrying out neutralization and removing the process solvent.

13. The waterborne urethane-based two-coat coating system of claim 9, wherein the at least one melamine resin is alkoxyalkylated.

14. The waterborne two-coat coating system of claim 9, wherein the at least one hybrid polyacrylate-polyurethane dispersion of the aqueous basecoat material is identical with the at least one hybrid polyacrylate-polyurethane dispersion of the aqueous clearcoat material.

15. A process for producing a waterborne urethane-based two-coat coating system comprising combining the aqueous clearcoat material of claim 1 with an aqueous basecoat material comprising at least one polyurethane dispersion, at least one hybrid polyacrylate-polyurethane dispersion, and at least one melamine resin.

16. The use of a waterborne two-coat coating system of claim 9 to coat a substrate, wherein a pretreated or unpretreated substrate is coated on at least one side with the aqueous basecoat material and dried, then coated with the aqueous clearcoat material and dried again.

17. A substrate coated with a waterborne two-coat coating system of claim 9.

18. The waterborne two-coat coating system of claim 9, wherein the weight ratio of a binder of the at least one melamine resin, based on the sum of the weight fractions of binders of the at least one polyurethane dispersion and of the at least one hybrid polyacrylate-polyurethane dispersion in the aqueous basecoat material is between 1:2 and 1:8.

* * * * *